Jan. 4, 1955  J. C. COPELAND  2,698,553
REFLECTING MAGNIFYING VIEWER
Filed Oct. 28, 1949  3 Sheets-Sheet 1
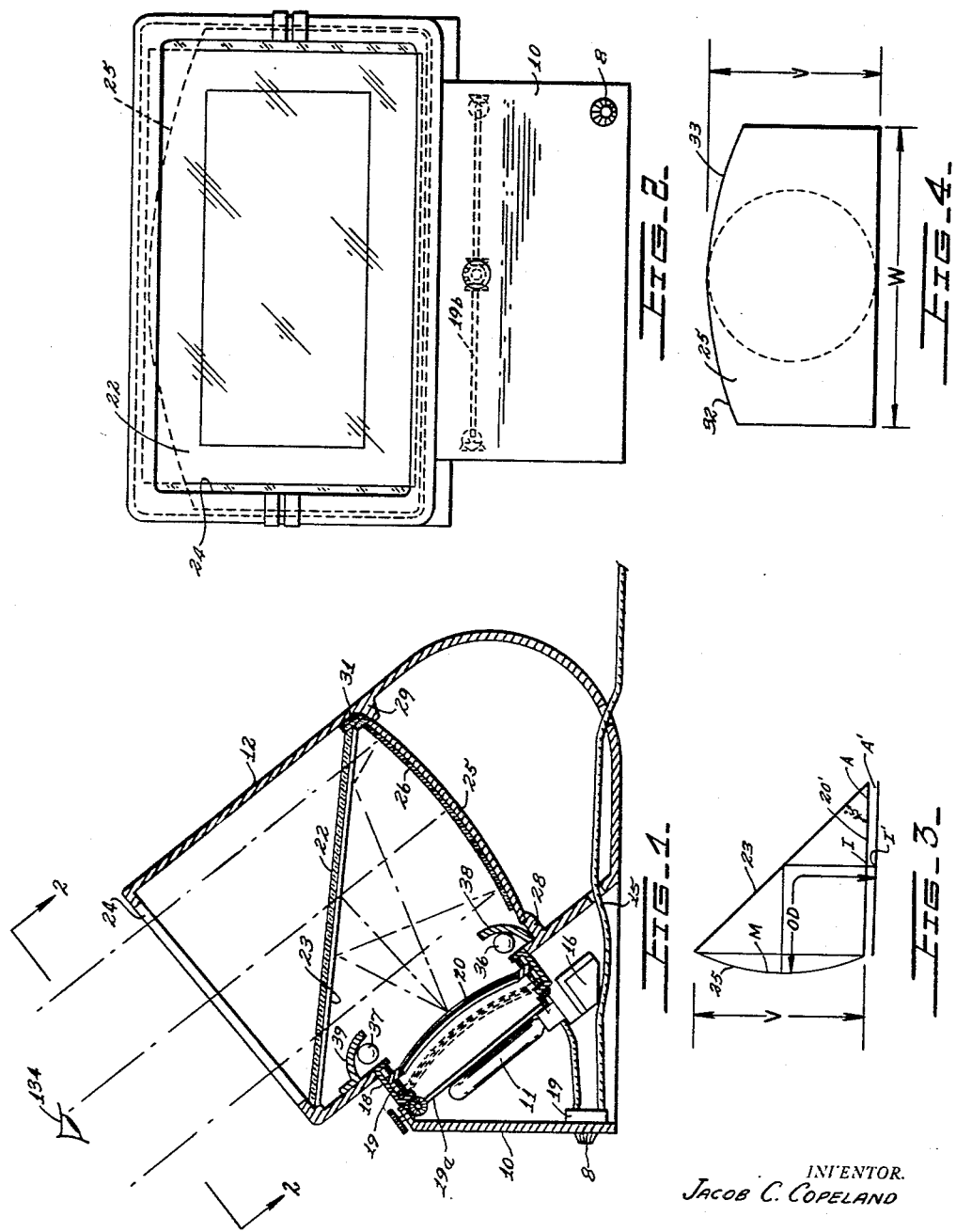
INVENTOR.
JACOB C. COPELAND
BY Greene & Dunn
ATTORNEYS Jan. 4, 1955   J. C. COPELAND   2,698,553
REFLECTING MAGNIFYING VIEWER
Filed Oct. 28, 1949   3 Sheets-Sheet 2
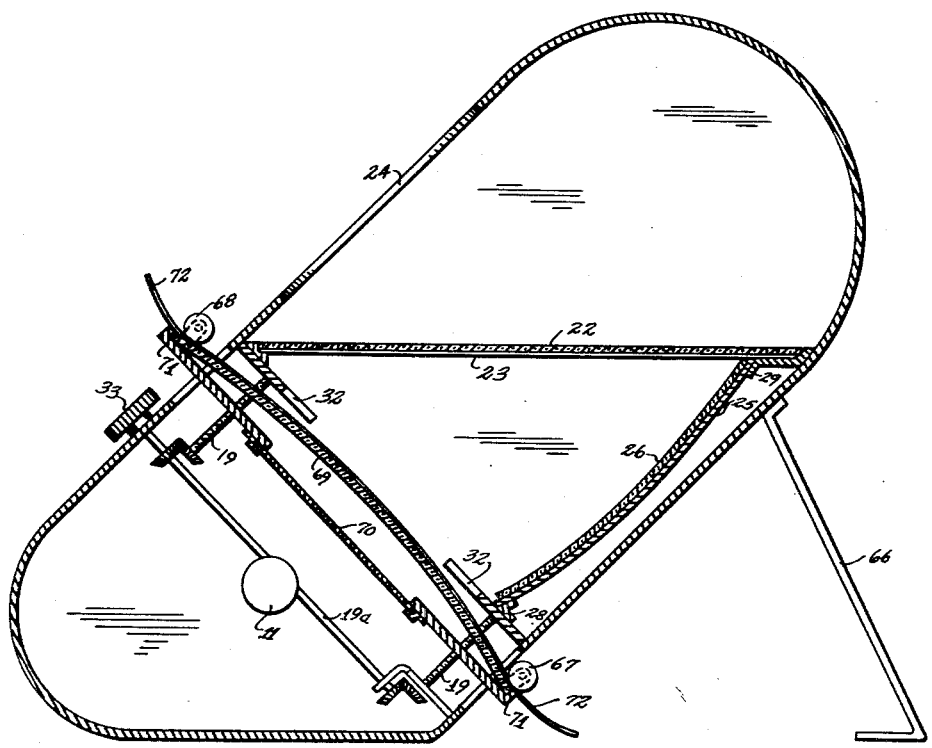
FIG_5_
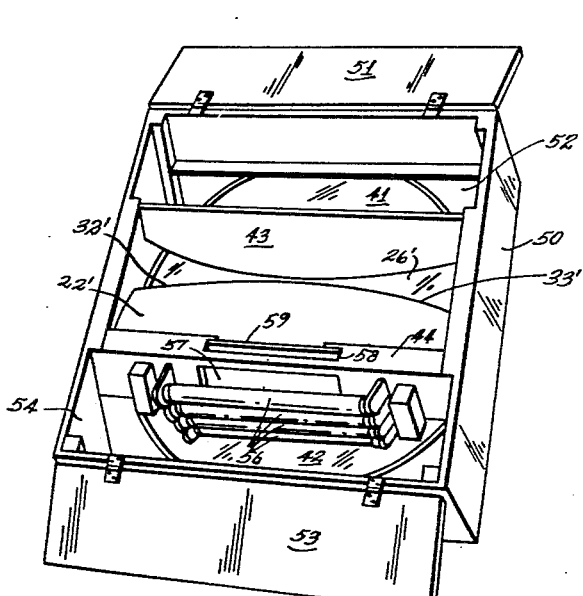
FIG_7_
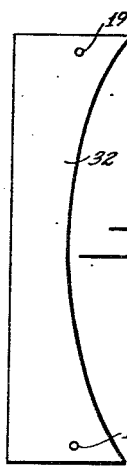
FIG_6_
INVENTOR.
JACOB C. COPELAND
BY Greene & Durr
ATTORNEYS Jan. 4, 1955  J. C. COPELAND  2,698,553
REFLECTING MAGNIFYING VIEWER
Filed Oct. 28, 1949  3 Sheets-Sheet 3
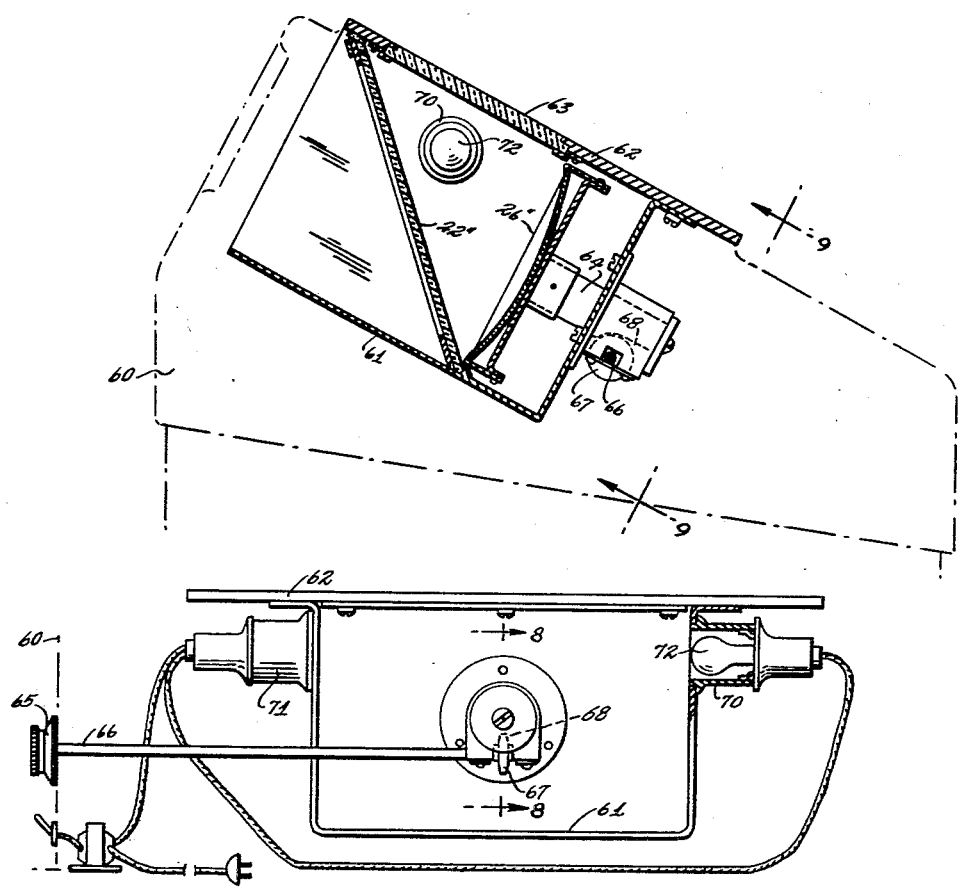
FIG. 8
FIG. 9
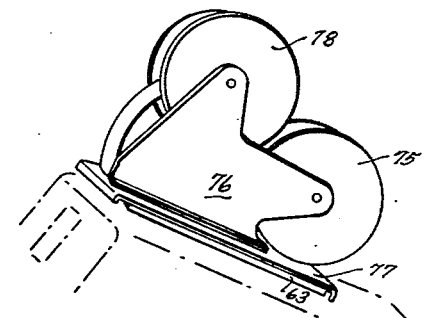
FIG. 10
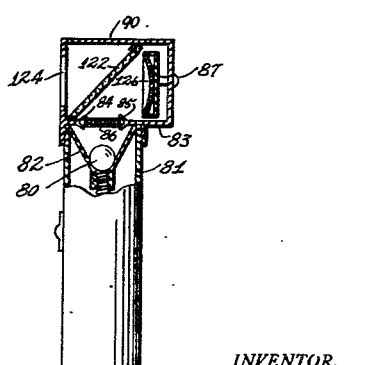
FIG. 11
INVENTOR.
JACOB C. COPELAND
BY Greene & Durr
ATTORNEYS

United States Patent Office 2,698,553
Patented Jan. 4, 1955

2,698,553

REFLECTING MAGNIFYING VIEWER

Jacob C. Copeland, Chicago, Ill.

Application October 28, 1949, Serial No. 123,996

6 Claims. (Cl. 88—29)

My invention relates to a magnifying viewer for magnifying and examining small photographic images; more particularly my invention relates to a viewer having new and unusual properties of image magnification produced by a reflecting system.

This application is a continuation-in-part of my application Serial No. 660,129 filed April 6, 1946, now Patent No. 2,581,000 issued January 1, 1952, which is a continuation-in-part of my application Serial No. 428,487 filed January 28, 1942, now abandoned.

One object of my invention is to provide a device adapted to magnify small transparencies or prints generally and especially photographic images either in the form of transparencies or prints, so that the magnified image can be viewed with both eyes without partial occlusion of the field of either eye.

It is another object of my invention to provide a device for binocular vision of such magnified images.

It is a further object of my invention to provide a device which produces a high and variable magnification by a reflecting system.

It is still a further object of my invention to provide a device which magnifies images in a reflecting system which device has a large viewing aperture so that an apparent stereoscopic effect is obtained because of a slight disparity between the two ocular images.

It is still a further object of my invention to provide a device which gives a magnified view of an object, which view is free from chromatic aberration, the device being relatively light in weight as compared with the refracting systems for magnification commonly employed in this art.

It is still a further object of my invention to provide a compact and economical device for comfortable and magnified viewing of small images.

It is still a further object of my invention to provide a magnifying reader for transparent or opaque microphotographs.

It is still a further object of my invention to provide a magnifying viewer which is substantially free from the aberrations known as "curvature of field," "distortion" and "chromatic aberration."

It is still a further object of my invention to provide a viewer or reader which is adjustable to alleviate discomfort of those observers having such ocular muscle anomalies as esophoria (tendency inward) and exophoria (tendency outward).

The magnifying viewer of my invention both illuminates and magnifies small images such as microfilm, reduced photostats, etc. It can be used for the examination of dental and medical X-Rays and photographs, and can be employed, as will be pointed out herein, for viewing transparencies or opaque objects.

Another object of my invention is to produce a device which is adapted for magnifying images of the fluorescent screen of a cathode-ray oscilloscope such as used in television receiving sets.

These objects and others ancillary thereto are obtained by combining a half silvered mirror with a front surfaced concave mirror in a housing which also contains a viewing aperture and a means for locating an object to be viewed. The image of the object is reflected from the half silvered mirror to the front surfaced concave mirror and the magnified virtual image is seen through the aperture of the housing which is directly in front of the concave mirror. The half silvered mirror is at an angle of 45° with respect to the plane of the concave mirror and the means for holding the object to be viewed. The applicant has found that there are certain critical dimensions that must be followed with his device which necessitate the location of the image holding or locating means closer to the axis of the spherical mirror than would be ordinarily expected. If these critical limits are not observed the image will be blurred or only partially visible or in the case of the larger viewers the image can be seen with only one eye at a time. The critical limits required are discussed below in connection with the description of the drawing.

The invention provides for the construction of viewers of varying sizes and magnification power. The viewers with the highest powers of magnification are smaller and are monocular whereas the larger viewers can be made binocular. Viewers having a spherical magnifying mirror with a focal length of 2.5 mm. have been constructed and have a magnifying power of 100×. The only limitations as to how large or how small the devices of this invention can be made are those limitations which are due to the practicability of manufacturing an accurate spherical mirror for the system. In all cases the critical dimensions set forth below must be observed and it is only by adhering closely to the critical dimensions that it has been possible to make the viewers of varying sizes.

The invention also comprises means for decreasing or for eliminating, the effects due to the aberrations known as "curvature of field" and "distortion" by curving the means for supporting the object to be viewed and by the insertion of masking plates adjacent the edges of the object. Ghost or secondary images are eliminated by employing a surface coated concave mirror.

Where large mirrors are employed for binocular vision the magnification may only be slightly greater than 1× or 2× but with the binocular viewers a pseudo three dimensional effect is obtained in spite of the fact that only a single image or photograph is viewed and only a single spherical mirror is employed in the optical system. This effect is possible only when the virtual image is viewed with both eyes with each of the eyes spaced from the axis of the spherical mirror. (The axis of the mirror may be defined as the normal to the plane which is tangent to the spherical mirror at the point on the mirror which would be the central point if the mirror were round as in the spherical mirrors ordinarily employed in optical instruments.) This phenomena may be explained as follows:

The two eyes are on opposite sides of a mono-axial optical system. As a result, the four off-axial aberrations of form namely, coma, distortion, curvature of field, and oblique astigmatism manifest themselves slightly for each eye. This effect is too small to disturb appreciably the resolution of the images yet the shapes of the two retinal images are opposite in their distortions. This produces retinal image disparities of the order ordinarily found in sets of stereograms which produces the illusion of relief. Stereoscopic vision is a result of stimulation of the horizontal retinal points by images which do not register on retinal corresponding points of the two eyes because of their disparities. It has been known that simple magnifying systems employing lenses covering both eyes give illusions of relief. This effect is somewhat exaggerated in the viewer of this invention because it is a mirror system which adds extra planes of reference not felt when lenses are used. One of these is the plane of the aperature which lies forward of the mirror plane. This adds to the illusion by producing what has been termed the "window effect." The plane of the mirror also aids in the illusion because an observer psychologically uses the plane of a mirror for reference more than that of a lens. Certain observers state that even when images are reflected by plane mirrors, they obtain an added stereoscopic effect.

The pseudo-three-dimensional effect is not always observed when it is necessary to view the virtual image of the object by placing one eye at the optical axis of the spherical mirror.

These and further objects of my invention will be apparent from a consideration of the drawings, a specific description of which here follows:

Figure 1 is a cross section of the magnifying viewer of my invention showing the pertinent structure thereof.

Figure 2 is a front view taken along the lines 2—2 of Figure 1.

Figure 3 is a diagrammatic view illustrating the relationship of the optical elements of the system according to the invention.

Figure 4 is a diagrammatic view showing the shape and dimensions of the concave mirror.

Figure 5 is a cross sectional view of a modified form of the viewer.

Figure 6 is a detail view showing the masking plate of the device of Figure 5.

Figure 7 is a perspective view of the inside of a large viewer made according to the present invention.

Figure 8 is a side cross sectional view of the optical system in another modified form of the invention showing a casing for the device in dotted lines.

Figure 9 is a view taken from the position of the lines 9—9 of Figure 8.

Figure 10 is a perspective view showing a viewer like that of Figure 8 equipped with reels carrying the material to be viewed.

Figure 11 is a view partly in cross section illustrating another modified form of the invention.

Referring now more specifically to the drawing, Figure 1 shows a lamp housing 10 which has the dual function both of enclosing the light source 11 and also supporting and properly positioning the main housing 12 which contains the mirror magnification system of the device of the invention. The housing 10 is formed so as to support the main housing 12 at an angle of between 30 and 45 degrees to the horizontal. The device of this figure is supported so that the system is maintained at an angle of about 40 degrees to the horizontal. The light source 11 enclosed in the housing 10 is mounted in a suitable socket 14 and is supplied with a source of current through wire 15. Between the socket 14 and the source of current 15 a variable resistance element 9 which is controllable by a knob 8 may be inserted so that the amount of illumination can be varied. The socket may be supported by any suitable structure such as the bracket 16.

In the opening between the main housing 12 and the housing for the light source 11, a means 18 for supporting the picture to be viewed is situated. In this particular figure this supporting means 18 comprises a glass sandwich which is curved slightly in one direction as shown, that is, the glass sandwich is curved convexly with respect to the mirror 22, and has a slot between the two pieces of glass forming the sandwich for receiving and positively holding the picture to be viewed. This sandwich 18 is supported for parallel movement toward and from the opening between the housing in the pinion gear mechanism 19, 19a and 19b. The support in this figure is curved for the purpose of compensating at least in part for the aberrations, known as "curvature of field," and "distortion," of the reflecting magnifying system. The lower part of the glass sandwich may be opal flashed glass or some other light diffusing or translucent material such as ground glass. Equivalent sheet plastic material may be substituted for one or both of the glass sheets of the sandwich. The upper part of the glass sandwich is obviously transparent. In the main housing 12 a semi-transparent plate 22 is positioned diagonally across the housing 12 and the lower inner surface of this diagonal 22 carries a semi-coating 23 which coating may be of aluminum or silver or reflecting alloys of the type of chromium-nickel alloys. This diagonally positioned semi-coated plate 22 is set at an angle of about 45° with respect to the aperture 24 of my viewer and with respect to the plane of the concave mirror 25 which has a surface coating 26 of some suitable metal such as aluminum or silver. Instead of the semi-transparent plate 22 a pelicular mirror may be employed. The mirror 25 is a concave spherical mirror while the diagonal mirror 22 is a plano-mirror. The mirror 22 is supported between brackets 29 and 30 while the mirror 25 is supported between brackets 28 and 29. These brackets may either be integrally formed in the housing 12 or may be suitably attached thereto. To prevent the transmission of shocks to the mirror system 22 and 25 rubber fittings 31 which are directly in contact with the one edge of each of the mirrors are shown adjacent the brackets 29 to support the mirrors in their proper position.

As a further feature of the invention, the device is adapted to view opaque photographic prints. Such opaque prints may be viewed by inserting such photographic prints in the supporting means 18 and impinging on the face thereof light from the light sources 36 and 37 which light sources are partially surrounded by reflecting shields 36 and 37 so as to throw all the light from the lamps 36 and 37 onto the image to be viewed and at the same time prevent light from these light sources from passing directly to the mirror 22 and unduly interfering with the reflecting system.

The operation of the device is schematically illustrated in Figure 1 and is particularly described as follows:

Light from the light source 11 is diffused as it passes through the lower or diffusing plate of the glass sandwich 19 whereupon it spreads and passes through the object 20 which may be a transparent or translucent photographic image. This object is then reflected by the flat semi-coated mirror surface 23 of the diagonal 22 to the spherical or concave mirror surface 26 of the mirror 25. The mirror 25 reflects and magnifies the image from 20 and directs it through the semi-coated plate 22 and through the aperture 24 to the eyes, one of which is shown at 134. The light rays pass through the semi-transparent plate or pelicular film 22 because the coating 23 is a semi-coating or a discontinuous coating which can both reflect and transmit light rays directed thereupon. The image which is seen by placing the eyes at 134 is a virtual magnified image of the object at 20. The instrument can be made with the object plane below the line where the eyes of the observer are to be placed as shown in Figures 1 and 2 or with the object plane above the eyes as shown in Figure 8 or with the object plane at either side of the eyes. The latter structure is not shown and is not preferred because the diagonal mirror will always be unsymmetrically situated with respect to the two eyes.

The front surface mirrors now available are superior to anything previously known. The only previous surface coated mirrors were made with silver by chemical deposition. Silver mirrors are perishable and required thin coatings of lacquer to give them any degree of durability. The new evaporated metallic films are resistant to atmospheric conditions and make the construction of a device of this invention practical. A back coated silver mirror would produce a secondary or ghost image which would be quite objectionable.

It is therefore essential that the concave mirror be front surface coated regardless of the nature of the reflecting coating. A back surfaced concave mirror produces a ghost image, thus destroying the function of the instrument. If the reflecting coating is deposited on the back surface of a concave mirror in which both surfaces are approximately parallel, the difference in radii of the two surfaces produces a different magnification for each of their respective images, which causes an overall blurring of the primary image from the reflecting surface.

Because of the exposure of a surface coated mirror to atmospheric conditions, it is very desirable to coat the mirror with metals other than silver. These other metals can be applied to the surface by an evaporation process.

A cathode ray oscilloscope tube such as employed in television sets may be placed in the device of the invention so that the lens or fluorescent screen of the tube is at the position of the glass sandwich 18 in Figure 1. The curvature of the lens of such tubes compensates for the aberrations known as "curvature of field" and "distortion".

The various optical distances which must come within certain critical limits are illustrated in Figure 3. The symbols F, A and V are defined as follows, F is the focal length of the spherical mirror, A is the plane which extends substantially perpendicularly from the lower edge of the spherical mirror and is at an angle of approximately 45° to the diagonal mirror, and V is the length of the perpendicular line from the edge of the spherical mirror which is adjacent the image plane A to the central point at the opposite edge of the spherical mirror which contacts the edge of the diagonal mirror. If the spherical mirror is cut with a straight edge at the top, V is measured to the point on the diagonal mirror where the central perpendicular line from the edge of the spherical mirror would contact the diagonal mirror if the surface were produced. Ordinarily the image plane A is at the top or bottom of the system but it can also be at the side thereof. The object or object holder is placed just below plane A in plane A'. With these dimensions as defined, then the ratio of the V/F must be 0.94 or somewhat less (down to 0.8, for example). Thus at no place in the optical system can the dimension V of the spherical mirror be greater than 94% of the focal length of the mirror. Variations from the rule cause the image to be blurred.

It is possible to make a viewer according to the invention from spherical mirrors which have larger ratios of V/F than 0.94 as will be more fully explained in connection with Figure 7, but in this construction only a part of the spherical mirror which has a dimension V such that V/F is less than 0.94 is used in the optical system.

All of the dimensions of the device of the invention are therefore determined by the focal length F of the spherical mirror. When a spherical mirror of focal length F is employed it must be cut down to a size such that V is equal to or less than 0.94 F, or provisions must be made to block out outside portions of the mirror which extend beyond a distance equal to 0.94 F (as illustrated in Figure 7). The corresponding dimension of the diagonal mirror will then be about 1.414 V and the object plane is defined by the two spaced edges of the diagonal and the spherical mirrors. It is obvious that the diagonal mirror can be extended beyond the distance of 1.414 V for the purposes of securing the diagonal mirror in place but these extensions are not a part of the optical system.

In Figure 4 the top edge 32, 33 of the spherical mirror 32, 33 is shown as curved. This is necessary if the diagonal mirror is to contact the top edge of the spherical mirror throughout the length of the edges. The spherical mirror could be cut off straight at the top edge but, as stated above, the dimension V would have to be measured up to the central part of the diagonal mirror. Where the spherical mirror is mounted on adjusting devices as in Figures 8 and 11 a much better and larger field of view throughout the various positions is obtained by curving the edge 32, 33 of the spherical mirror to follow the edge of the diagonal mirror rather closely. Instead of curving the edge 32, 33 of the spherical mirror, the corresponding edge of the diagonal mirror may be cut on a curve to follow the curvature of the spherical mirror as shown in Figure 7.

The values of V/F less than 0.94 permit an adjustable device to be constructed so that the system can be adjusted to compensate for myopia. In Figure 8, for example, when V/F is 0.8 and the spherical mirror is moved against the diagonal mirror, an adjustment corresponding to approximately 1.5 diopters is obtained. In Figure 1 the object plane is adjustable by the gearing 19, 19a and 19b and the spherical mirror 26 here has a dimension V considerably less than 0.94 (depending on the amount of adjustability) to compensate for the fact that the object plane may be moved considerably below the plane defined by the spaced edges of the diagonal and spherical mirrors.

Where the device is to be constructed for binocular vision (what has some very important advantages including the pseudo-three dimensional effect described above) other more or less critical dimensions must be observed. If, for example, the object plane is to be below or above the two eyes of the observer as illustrated in Figures 1, 2, 4 and 8 the width W should be 1½ to 2 times as large as V and in addition should be at least 60–70 mm. wide, that is, at least as wide as the pupillary distance. Figure 4 shows a circle within the borders of the mirror 25 to indicate how the mirror differs from ordinary circularly shaped spherical mirrors. Figure 7, on the other hand, shows how much of a large, ordinary, circular shaped spherical mirror must be blanked out in order to come within the critical proportions of this invention.

It is also possible to place the object plane at one side of the two eyes of the observer. This construction is less desirable since the diagonal mirror is not symmetrically placed with respect to the two eyes. When such a device is to be adapted for binocular vision the dimension V must also be equal to the pupillary distance of the eyes or about 60–70 mm. Thus, for such a device a spherical mirror with a focal length of at least 64 mm. must be employed.

When a monocular system (one of very high magnification for example) is constructed the width of the mirror is substantially equal to its height, in other words a spherical mirror with a substantially square periphery is employed.

Because the image is reflected by mirrors and more particularly front surface mirrors, the optical system is free from chromatic aberration. By the use of the curved sandwich holding device the aberrations of "curvature of field" and "distortion" are eliminated.

The magnification obtained by the concave mirror system here described is obtained with a mirror having a longer radius of curvature than the total radius of curvature of a refracting system of the same power. Thus a larger diameter of viewing aperture can be obtained as well as a marked decrease in weight in the mirror system as opposed to the refracting system. The advantages of the large aperture are many. The large aperture enables both eyes to be used without partial occlusion of the image of each eye as is necessary in small aperture systems. Thus an important advantage of the large aperture as set out in this system is the fact that binocular vision is obtained.

A further feature of this large aperture is that both eyes can comfortably view the image in the normal manner of use of the eyes so that undue strain and tiring effects are avoided. By making the image holding objective 19 adjustable it is also possible to alleviate discomfort of observer's having such ocular muscle anomalies as esophoria (tendency inward) and exophoria (tendency outward). An observer with esophoria, for example, will ordinarily have his discomfort alleviated by moving the object forward of the focal point.

The front surface mirror magnification system here described produces, because of the slight disparity between the two ocular images obtained by this system, an apparent or pseudo stereoscopic effect. This apparent stereoscopic effect means that the image appears to be three dimensional and this has marked advantages as is well known in the art. This effect is very important for large systems for advertising purposes, for example.

The viewer of my invention is distinguished further by the fact that it is a protected mirror system in that the front surface mirrors, that is both the diagonal and concave mirrors, are so positioned that the mirror surface is protected from abrasion as from dust and other foreign matter and thus long life of the mirrors and good quality of the image is insured. This avoidance of abrasion, is extremely important because in a mirror system of this type, particularly a front surface mirror, cleaning, even in the presence of ordinary dust, can result in a destructive abrasion.

According to the modification shown in Figure 5, the light and optical system are all included in a single housing. In this figure, which is similar to Figure 1, like numbers refer to like parts of the devices.

For compactness the ovate housing as shown is used and the housing is supported in the proper position by the bracket 66 which may be removable, if desired.

Figure 5 differs essentially from Figure 1 in the curved means provided for supporting the film or picture in a curved position. For this purpose a plate 73 (for example, a metal plate) with a rectangular opening in the center for receiving the ground or translucent glass 70 is provided. This metal plate also has flanges 71 at each side for supporting the transparent or translucent plate 69. Rollers 67 and 68 are attached to brackets 72 which are preferably integral with the plate 73 for pressing the picture or film snugly against the curved plate 69. The curved plate 69 is preferably curved only in the direction shown. The masking plates 32 (shown in detail in Figure 6) compensates for the distortion aberrations at the top and bottom edges of the image.

The structure of one of the largest viewers made according to the present invention is illustrated in Figure 7. This device is constructed with a spherical mirror 26' having a circular shape since no mirror having the shape required by this invention (see Figure 4) is available and a large spherical mirror of this type represents too valuable an investment to risk the chance of cracking the mirror in the process of cutting off the top and bottom thereof. As an alternative therefore the top and bottom portions 41 and 42 of the spherical mirror 26' are blocked out by partitions 43, 44. The entire mirror is enclosed in the housing 50. Hinged to the top of the housing 50 is the lid 51 for the top chamber containing the area 41 of the mirror; this chamber is entirely useless except as a protection for the excess portion 41 of the spherical mirror 26'. Hinged at the lower end of the housing 50 is the lid 53 for enclosing the lower chamber 54 which also contains the illuminating means 56. The partition 44 contains an opening 57 in the center portion thereof and a slot 58 extending from the opening 58 to the top of the partition 44. The picture to be viewed is slid into the area of the opening 57 beneath the glass window 59, through the slot 58. The size of the viewer made according to the modification shown in Figure 7 is limited only by the availability of large mirrors but viewers with spherical mirrors which are 25" in diameter have been constructed. The diagonal mirror is shown at 22' and in this viewer it is necessary to round off the corner 32' and 33' of the diagonal mirror 22' instead of rounding off the edges of the spherical mirror (as shown at 32, 33 of Figure 4) so that the top edge of the diagonal mirror 22' fits closely against the surface of the spherical mirror 26'.

Figures 8 and 9 show another modification of the invention which is especially suited for the reading of microprints. For simplicity the mounting 60 for the device is shown only in dotted lines. The optical system of Figures 8 and 9 is mounted in the housing 61 the top portion 62 of which contains the window 63 which is the object plane for the device. The diagonal half coated mirror 22 is located at an angle of approximately 45° to the window 63 and the plane of the spherical mirror 26 is 90° with respect to the window 63. The spherical mirror 26 is mounted on a moveable shaft 64 and the optical distance of the mirror 26" from the object can be adjusted by rotating the knob 65 which in turn rotates the shaft 66 and the roller 67 which frictionally engages a slot 68 at the rear end of the shaft 64. The housing 61 also contains two cylindrical lamp holders 70, 71 at each side thereof containing the lamps 72 for illuminating the microprint placed on the window 63.

This type of apparatus is very convenient for reading microprints. Figure 10 shows an attachment for the apparatus of Figures 8 and 9 in which the microprints are held on or printed directly on a roll of paper which is wound on spool 75. The roller 75 is detachably held in bracket 76 which projects upwardly from the base 77 of the attachment. The base 77 contains an opening, not shown, adjacent the window 63 and as the printed roll is unwound from the spool 75 onto the spool 78 it passes adjacent the window 63 of the viewer. This attachment is not a part of the present invention but is added to illustrate how the device of Figure 8 is operated.

A small type of device for viewing small microfilms is shown in Figurue 11. The device shown has a self contained illuminating unit consisting of a small flashlight cell (not shown), bulb 80 and reflector 82, all contained in a casing 81. Attached to the end of the casing 81 is the housing 90 holding the optical system of the present invention. The side 83 of the housing 90 which is adjacent the reflector of the flashlight portion contains two holding means 84, 85 for holding and positioning a supporting means 86 such as a window or a glass sandwich or microfilm. The diagonal mirror 122, spherical mirror 126 and viewing opening 124 are arranged as in Figure 1. The levice of Figure 11 however is adapted only for monocular vision and the spherical mirror 126 has a substantially square outline. The critical limits as to the height of the mirror 126 relative to its focal length are still observed. The mirror 126 is adjustable with respect to the diagonal mirror 122 and the object 86 by means of the small screw.

Small monocular viewers having spherical mirrors and approximate magnifications as follows have been constructed:

| F of spherical mirror | magnification |
| --- | --- |
| 25 mm | 10× |
| 12½ mm | 20× |
| 6¼ mm | 40× |
| 2½ mm | 100× |

It is unnecessary to give the other optical dimensions of such viewers as the height V of the spherical mirror is always given by the formula $V = 0.8\,F$ to $.94\,F$ and since all the other dimensions of the system follow when the dimension V is known. Attention is called to the large magnification which it is possible to obtain with a single magnifying means about the size of a thimble. As in the case of the very large view of Figure 7 the limit to the amount of magnification obtainable appears to be limited only by the availability of spherical mirrors of the required size.

It will be seen that the optical system of this invention is very versatile and substantially free from optical aberrations so that the system is adapted for constructing devices having binocular vision with a pseudo three dimensional effect or for constructing devices of high magnification and small size and weight for monocular vision.

I claim:

1. A magnifying binocular viewer comprising a housing, a concave spherical mirror disposed at a first side of said housing with its concave side facing inwardly, said concave side being surface coated with a metallic film which is stable to the changing thermal and chemical condition of the atmosphere, a binocular viewing aperture disposed at a second side of said housing which is opposite said first side, a semi-transparent reflecting mirror of substantially the same width as said spherical mirror extending across said housing with one edge thereof adjacent the coated surface of the spherical mirror and the opposite edge spaced from the corresponding portion of the spherical mirror and close to the viewing aperture, the said adjacent edge of said diagonal mirror being at least substantially in contact with said spherical mirror at at least two spaced points, a means for positioning a picture to be magnified and viewed, said positioning means being disposed in the area between the spaced edges of the two mirrors and substantially parallel to the axis of said spherical mirror, said reflecting mirror being positioned at an angle of substantially 45° with respect to the optical axis of said spherical mirror and the plane of said picture holding means, means for illuminating said picture so that light therefrom is directed by said reflecting plate to said spherical mirror and through said viewing aperture, said concave mirror having a focal length F and a vertical dimension V behind the diagonal mirror as measured from the edge thereof which is adjacent to said diagonal mirror to the opposite edge thereof, the ratio of $V/F$ being equal to 0.8 to 0.94, said concave mirror also having an F of at least 6 cm. and being substantially rectangular in configuration with a width of at least 1.5F, the central portion of a picture held by said picture positioning means being substantially at the focal distance from said spherical mirror as measured along the optical axis of said spherical mirror to said semi-transparent mirror and thence to said picture whereby the image can be viewed with both eyes equally spaced on opposite sides of the optical axis of said spherical mirror.

2. The device of claim 1 in which the means for positioning the picture comprises means for curving two opposite edges of the picture away from the diagonal mirror to decrease the aberrations known as "distortion" and "curvature of field."

3. A magnifying viewer comprising a box-like housing, a surface-coated concave spherical mirror disposed in said housing at a first side thereof, a viewing aperture disposed at a second side of said housing opposite said first side, a source of light shielded from direct impingement upon said aperture and said concave spherical mirror, a support adapted to hold a picture at substantially right angles to the aperture and the mirror and out of the collecting and viewing fields of the concave mirror, and positioned so as to be illuminated by said source of light, said support being curved, means cooperating with said curved support to hold a picture against the same, a semi-transparent reflecting plate in the housing substantially coextensive with the viewing aperture and the spherical mirror and at an angle of about 45° thereto, whereby transmitted light from said picture is reflected by the semi-transparent reflector to said concave spherical mirror and back through the semi-transparent reflector so that a virtual magnified image is visible from the viewing aperture, and at least one masking plate between the picture supporting means and the semi-transparent mirror, said masking plate being located near the edges of the picture supporting means and having a concave shaped inner edge to eliminate a non-rectilinear edge of the virtual image visible from said viewing aperture, said concave mirror having a focal length F and a vertical dimension V behind the diagonal mirror as measured from the edge thereof which is adjacent to said diagonal mirror to the opposite edge thereof, the ratio of $V/F$ being equal to 0.8 to 0.94.

4. A magnifying viewer comprising a box-like housing, a surface-coated concave spherical mirror disposed in said housing at a first side thereof, a viewing aperture disposed at a second side of said housing opposite said first side, a source of light shielded from direct impingement upon said aperture and said concave spherical mirror, a support adapted to hold a picture at substantially right angles to the aperture and the mirror and out of the collecting and viewing fields of the concave mirror, and positioned so as to be illuminated by said source of light, said support being curved, means co-operating with said curved support to hold a picture against the same, a semi-transparent reflecting plate in the housing substantially co-extensive with the viewing aperture and the spherical mirror and at an angle of about 45° thereto, whereby transmitted light from said picture is reflected by the semi-transparent reflector to said concave spherical mirror and back through the semi-transparent reflector so that a virtual magnified image is visible from the viewing aperture, and at least one masking plate between the picture supporting means and the semi-transparent mirror, said masking plate being located near the edges of the picture supporting means and having a concave shaped inner edge to eliminate a non-rectilinear edge of the virtual image visible from said viewing aperture, said concave mirror having a focal length F and a vertical dimension V behind diagonal mirror as measured from the edge thereof which is adjacent to said diagonal mirror to the opposite edge thereof, the ratio of $V/F$ being equal to 0.8 to 0.94, said concave mirror having an F of at least 6 cm. and a width of 1.5 F to 2F whereby the image can be viewed with both eyes and with the eyes equally spaced from the optical axis of said spherical mirror.

5. A magnifying binocular viewer comprising a housing, a concave spherical mirror disposed at a first side of said housing with its concave side facing inwardly, said concave side being surface coated with a metallic film which is stable to the changing thermal and chemical condition of the atmosphere, a binocular viewing aperture disposed at a second side of said housing which is opposite said concave mirror, and perpendicular to the optical axis thereof, said spherical mirror having a focal length F which is at least 6 cm. and having a width which is at least 1.5F, a semi-transparent mirror of substantially the same width as said spherical mirror extending across said housing with one edge thereof adjacent the coated surface of the spherical mirror and the opposite edge spaced from the corresponding opposite portion of said spherical mirror and close to said viewing aperture, the said adjacent edge of said diagonal mirror being at least substantially in contact with said spherical mirror at at least two spaced points, means for positioning a picture to be magnified and viewed disposed in the area between the spaced portions of said two mirrors and substantially parallel to the optical axis of said mirror, said semi-transparent mirror being positioned at an angle of substantially 45° with respect to the optical axis of said spherical mirror, means for illuminating a picture held by said picture positioning means so that light from said picture is directed by said semi-transparent mirror to said spherical mirror and thence from said spherical mirror through said viewing aperture, the field of said spherical mirror which is covered by said diagonal mirror and adapted to be seen through said viewing aperture being substantially rectangular in configuration and having, in addition to said width of at least 1.5F a vertical dimension V as measured from the edge of said spherical mirror which is adjacent to said diagonal mirror to the portion thereof which is adjacent to said picture positioning means such that the ratio of $V/F$ is less than 0.94 and so that the optical distance from the positioning means to the spherical mirror is substantially equal to F whereby the image of a picture held by said positioning means can be viewed through said viewing aperture with both eyes equally spaced on opposite sides of the optical axis of said spherical mirror.

6. The device as set forth in claim 5 in which the adjacent edge of one of said spherical mirror and the diagonal semi-transparent mirror is convexly curved so as to fit snugly upon the surface of the other of said mirrors.

References Cited in the file of this patent

UNITED STATES PATENTS

| Number | Name | Date |
|---|---|---|
| 1,082,678 | Casler | Dec. 30, 1913 |
| 1,294,172 | Rogers | Feb. 11, 1919 |
| 1,489,510 | Stromberg | Apr. 8, 1924 |
| 1,699,689 | Carry | Jan. 22, 1929 |
| 1,706,218 | Chretien | Mar. 19, 1929 |
| 1,900,557 | Holcombe | Mar. 7, 1933 |
| 2,002,074 | Basson | May 21, 1935 |
| 2,076,103 | Thorner | Apr. 6, 1937 |
| 2,093,520 | Hayashi | Sept. 21, 1937 |
| 2,113,397 | Croft | Apr. 5, 1938 |
| 2,165,078 | Toulon | July 4, 1939 |
| 2,172,775 | Ott et al. | Sept. 12, 1939 |
| 2,211,376 | Isbell | Aug. 13, 1940 |

FOREIGN PATENTS

| Number | Country | Date |
|---|---|---|
| 400,182 | France | May 24, 1909 |
| 463,891 | Great Britain | Apr. 8, 1937 |